July 15, 1952  R. HELMER  2,603,678
MAGNETIC TORQUE TRANSMISSION
Filed Oct. 1, 1946  5 Sheets-Sheet 1

Inventor
ROBERT HELMER
By Van Deventer & Grier
Attorneys

July 15, 1952 R. HELMER 2,603,678
MAGNETIC TORQUE TRANSMISSION
Filed Oct. 1, 1946 5 Sheets-Sheet 3

Inventor
ROBERT HELMER
By Van Deventer & Grier
Attorneys

July 15, 1952     R. HELMER     2,603,678
MAGNETIC TORQUE TRANSMISSION

Filed Oct. 1, 1946     5 Sheets-Sheet 4

Inventor
ROBERT HELMER
Van Deventer & Grier
Attorneys

Patented July 15, 1952

2,603,678

UNITED STATES PATENT OFFICE 2,603,678

MAGNETIC TORQUE TRANSMISSION

Robert Helmer, Great Neck, N. Y., assignor to Helmer Transmission Corporation, a corporation of Delaware Application October 1, 1946, Serial No. 700,569

7 Claims. (Cl. 172—284)

This invention relates to improvements in electric devices and more particularly to a torque transmitter in which hysteresis is employed to effect a movement of one member positioned in the magnetic field set up by a second moving member.

An object is to produce an electrical device in which hysteresis is utilized as a working force.

Another object is to produce an electrical device of the class described, in which eddy currents are reduced to a minimum and no use is made of them.

Another object is to reduce the heating effect heretofore present in devices of the class described, where eddy currents are present.

Another object is to produce a device of the class described having rotatable members, one of which is subject to sufficient hysteresis production to operate in synchronism with the other member under load, and to operate at any speed other than synchronism at a greater load, the input speed remaining constant.

Another object is to provide a device of the class described, wherein the driven member, when held against revolution, delivers maximum torque. This is particularly useful when starting under heavy load.

Another object is to provide a device of the class described, including means for reducing eddy current loss to permit operation of the device at a heat loss proportional to the load applied to the driven member.

Another object is to provide an electrical device of the class described having a ring member comprised of laminated, hardened steel having high hysteresis.

Another object is to produce an electrical device of the class described having pole shoe faces in combination with a ring of hard steel so that said pole shoe faces overlie substantially all of the adjacent face of said ring whereby increased efficiency is obtained as more fully hereinafter described.

Another object is to provide a magnetic torque transmission of the construction described, capable of transmitting any desired small or large power and more particularly substantial horse power (say 5 horse power and over), and yet be of reasonable size and cost.

Other objects and advantages will be apparent from the following specification in which, by way of illustration, preferred embodiments of the device will be disclosed. It will be understood, however, that these disclosures are merely illustrative and not limitative of the invention, and that details of construction can be widely varied once the main inventive concept herein disclosed is understood. The invention is therefore that broadly defined by the appended claims.

Figure 3:
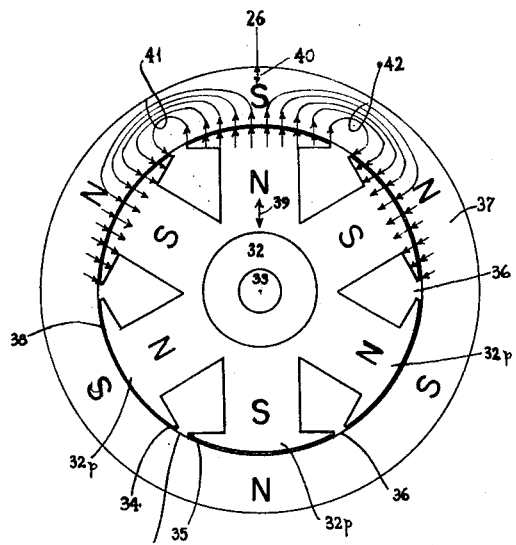
Figs. 3 and 4 are diagrammatic sectional views of a machine embodying the invention.

Before describing physical embodiments of the invention, it is desirable to point out that in all electrical rotating machines there are what are commonly called "core losses." This term "core loss" is employed to designate the total internal loss in the rotating apparatus due to the combined effect of eddy currents and hysteresis. But, as the losses due to the former are governed by laws totally different from those applicable to the latter, special analysis is required to distinguish one from the other.

Eddy currents

Since a varying magnetic field induces an E. M. F. in every path that links the flux, such an E. M. F. will, in general, cause a flow of current in the magnetic materials comprising the magnetic circuit. Such currents, called eddy currents, or Foucault currents cause $I^2R$ losses.

If the mass of iron in an armature pole is so disposed that, as it rotates, the distribution of the lines of force in the narrow field (air gap) between the armature and pole piece is being continually altered, then, even though the total amount of magnetism of the field remains unchanged, eddy currents will be set up in the pole piece, causing heat which performs no useful work.

The eddy current loss, per cycle, is directly proportional to the frequency and the total eddy current loss is proportional to the square of the frequency. In electrical machinery these eddy currents are often responsible for more than 50% of the total core losses.

The energy generated by eddy currents is dissipated in heating the iron. The paths of the eddy currents are more or less indeterminate, being in general dependent upon the shape of the iron with respect to the direction of the flux.

Hysteresis

Hysteresis is that quality in iron which causes the lagging of the induction behind the magnetic forces. It causes a loss when the direction of induction is reversed and results in the heating of the iron. It increases in direct proportion to the number of reversals, and approximately as the 1.6th power of the maximum value of the induction in the iron.

In a motor, when the iron pole pieces of an armature are caused to rotate past stationary field poles, hysteresis results and appears as a counter-torque. That is, a torque counter to the direction of the rotation of the armature. This counter-torque is produced by the unwillingness, so to speak, of the iron molecules to be continually orientated and re-orientated, and is used in carrying out the invention herein disclosed.

The established practice to minimize hysteresis loss is to select a soft iron or steel with the highest permeability. An iron with a high B/H curve or a high permeability has a very small retentivity and coercive force, therefore the molecular friction is small. In prior art devices where "steel" is mentioned, it usually has characteristics that will reduce hysteresis to a minimum as the hysteresis is not used to perform useful work.

The area of a hysteresis loop is proportional to the hysteresis loss. It is shown that thin laminations have higher hysteresis losses per unit weight than thick sheets, and the finer the grain structure, the greater the hysteresis loss.

The hysteresis loss per cycle is independent of the frequency; i. e. the total hysteresis loss is directly proportional to the frequency.

Magnetic analysis of iron shows that there is a relation between mechanical and magnetic properties. There is a very striking relation between hysteresis and mechanical properties, such as hardness and tensile strength. By plotting Brinell hardness and the tensile strength against the product of the maximum induction and coercive force, $(B_m \times H_c)$, this product is found to be approximately proportional to the hysteresis loss.

The magnetic properties of a material are often greatly affected by heat treatment. A quench produces mechanical strains in the material which, in general, lowers the magnetic quality by causing a decrease in the permeability and an increase in the coercive force and the hysteresis loss. It increases the $H_c$.

Bearing the foregoing relationship in mind, the inventive concept herein disclosed is that of reducing eddy currents to a minimum, while at the same time provision is made to increase hysteresis to a maximum. This, in any given device may be attained by selecting a suitable steel, such as a high carbon steel and hardening it, and using it in the form of thin laminations of fine grain structure, these forming a magnetic circuit with the highest hysteresis possible. By this means it is possible to make use of the hysteresis (heretofore a loss) as a means of transmitting torque from one member to another while reducing eddy current losses to a minimum.

It will be observed that former practice has been deliberately avoided in the constructions to be presently described herein, the invention utilizing magnetic phenomena (hysteresis) in a new and useful way.

By way of illustration, the invention will be applied to a magnetic torque transmission, although it will be obvious that it can be applied to many other electrical devices used for a wide variety of purposes.

In such torque transmissions, there is a driving member usually connected to a source of power such as an electric motor, and a driven member connected to the work—for example, a printing press or the like.

The driving and driven members are mounted to rotate one within the other in the transmissions herein described. The driving member is located inside the driven member and carries the field windings and the driven member is ring-shaped. It will be obvious that the position of the driving and driven members may be reversed from the position herein described, in that the driving member may be a body of steel revolving within the driven member, which would then be the external member of the pair carrying the field windings.

Prior art devices

Reference will now be made to some prior art devices as some of these have parts that pictorially resemble parts used in the instant invention although none of them embody the inventive concept disclosed.

These devices often comprise magnetic couplings and include a revolvable 2 pole electromagnet, the poles of which are spaced adjacent a revolvable 2 pole permanent magnet. Usually the electromagnet is the driving member and the permanent magnet is the driven member, and the load is connected to the driven member.

In some cases, both the driving member and the driven members are permanent magnets.

Such magnetic couplings have been used in connection with driving fans, particularly cooling fans in refrigeration units for household use, where a small amount of coupling torque is necessary.

While it is true that the permanent magnets in such devices are made of hard steel and have high hysteresis, it will at once be apparent that with such devices the driving and driven members must be in step with each other, as the operation of such devices is dependent upon the direct magnetic pull of the poles of the driving member on the unlike poles of the driven member, and therefore the driving and driven members must be in synchronism; if at any time the load is sufficient to cause slip, the driven member will no longer be subject to sufficient magnetic attraction. This is the same phenomena as that which occurs in a synchronous motor when overloaded.

These devices are usable only when a small amount of power (usually less than 1/20 horse power) is to be transmitted, and are limited to such fractional horse power uses, because if any attempt is made to increase the size or the strength of the permanent magnets to handle greater loads, the size and cost of the device becomes prohibitive.

As an example, it might be pointed out that a magnetic transmission of this type capable of handling 5 horse power would be several times the size and weight of an ordinary 5 horse power motor, with which it would be used, and could only run in synchronism as previously referred to.

So that, while it will be seen that devices such as described do incorporate a magnetic driven member of hard steel, they do not operate on the principle herein disclosed, and do not have the advantages of the present invention; and cannot be used for the same purpose.

A second class of prior art machine to which reference will now be made are termed "eddy current" machines. The construction of these machines pictorially resembles the instant invention, which, however, clearly distinguish therefrom in many respects as hereinafter pointed out.

Figure 1:
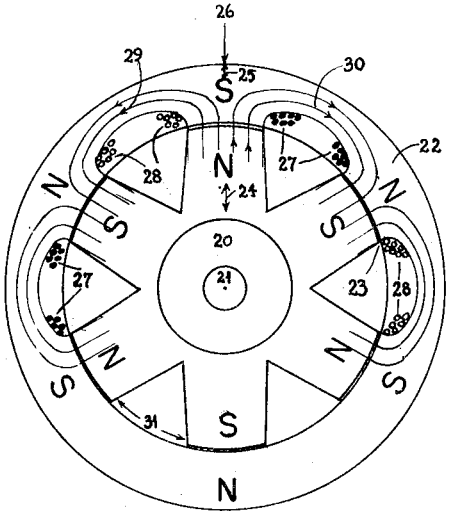
Figs. 1 and 2 are diagrammatic sectional views of a prior art machine.
Figure 2:
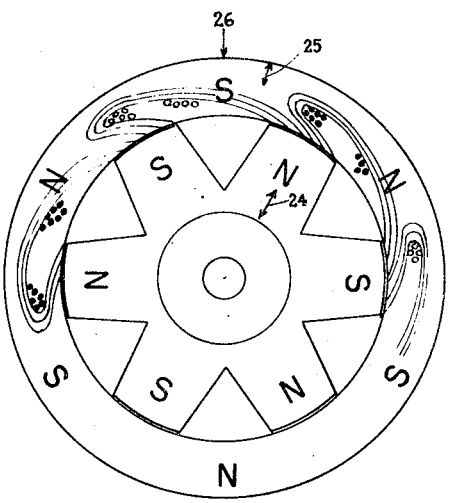

In order that these distinctions between the instant invention and the prior art may be clearly understood, reference is now made to Figs. 1 and 2, which show diagrammatically elevational longitudinal sectional views of an eddy current transmission of a well known type.

Referring to Fig. 1, the numeral 20 denotes the driving member of the device supported on the shaft 21, connected to a source of power such as an electric motor or the like (not shown).

The driving member may have any equal number of poles N, S, and, for the sake of illustration, a standard 6 pole arrangement is shown. The driving member is usually constructed of iron.

Each pole has a field winding (not shown) and the windings are connected to a suitable source of direct current in any known manner so that the driving member may be energized while rotating to have alternate N, S poles as shown.

A driven member 22 is comprised of a ring of magnetic material, such as iron or steel, having sufficiently low electric resistance to the flow of eddy currents to enable same to be set up by flux generated in the driving member.

The driven member is supported to rotate about the path of travel of the driving member 20, and a small air gap exists between the driving member and the inner surface 23 of the driven member hereinafter sometimes termed the ring.

It will be understood that the ring is suitably supported on a spider which has a shaft (not shown) axially aligned with the driving shaft 21.

Assuming the driving member to be energized, and rotating in a clockwise direction, and that the driving and driven members are lined up so that the points 24 and 25 thereon are in line with the vertical axis 26 of the machine as shown in Fig. 1, induced currents will be set up on the ring 22, and may be assumed to flow in planes perpendicular to the plane of the paper on which the drawings appear. The currents shown at 27 flow away from the observer and the currents shown at 28 flow towards the observer.

These induced currents are caused by the flux indicated at 29 and 30 which flows through the body of the ring 22 from the poles N, S of the driving member.

Assuming that the driving and driven members rotate so that the points 24 and 25 thereon move from the positions shown in Fig. 1 to those shown in Fig. 2, it will be apparent that the flux lines 29, 30 are dragged through the body of the ring as the poles N, S rotate. This shifts the paths 27, 28 of the induced current 4 in the body of the ring, thus giving rise to eddy currents which act to couple the ring 22 to the driving member 20 so that a torque is generated between the members.

The torque (twisting effort) in foot pounds being $$T = \frac{5250 \times \text{horsepower of output shaft}}{\text{R. P. M. of output shaft}}$$

It will immediately be noted that the face of the pole pieces N, S in devices of this kind do not substantially cover the inner face of the ring, comparatively wide gaps such as 31 being therebetween. In fact, the poles are often tapered to increase these gaps to cause a greater change in flux distribution to produce higher eddy currents. These eddy currents are induced by the sweeping of successive electromagnetic poles past given points on the ring in which the eddy currents are induced, due to relative movement of the poles and the ring, which must occur to produce these currents and any torque.

It will also be observed that if any hysteresis is present in the structure shown in Figs. 1 and 2, that it is parasitic so far as any coupling (torque) effect is concerned, being opposed to, and tending to nullify the eddy current effect. This will be evident from a discussion of the hysteresis phenomena to be presently presented in connection with the improved device forming the subject matter of this application.

The device shown in Figs. 1 and 2 is readily recognized as an adaptation of a squirrel cage motor in which both the "rotor" corresponding to 20, Figs. 1 and 2, and the "frame" corresponding to 22, Figs. 1 and 2, are allowed to rotate at variable relative speeds.

In the squirrel cage motor, cage bars (usually of copper) are used in the frame and the rotation of the motor produces a revolving primary magnetic field.

In the machine shown in Figs. 1 and 2, the principle of operation is the same, but the eddy currents in the frame do not have the directed low resistance circulation provided by the squirrel cage bars just referred to. The eddy currents circulate in the body of the ring 22.

It is evident therefore, that when "steel" is used in the ring of the eddy current device shown in Figs. 1 and 2, that this "steel" is of such characteristics as to form a low resistance path for the induced eddy currents, and that this "steel" cannot therefore be of the same characteristics as the steel used in the device hereinafter disclosed and forming the subject matter of this application.

An analysis of the device shown in Figs. 1 and 2 will immediately reveal that the torque will increase with the output speed up to some given point depending on the structural details of the machine, but that thereafter the torque will drop off. In other words, as the sweep rate of the poles increases above a predetermined rate, the torque diminishes.

It will also be noted that in a machine of this description the driving and driven members can never run in synchronism, slip being present and necessary under any condition of load to provide torque.

The loss due to slip is evidenced in the formation of heat due to the eddy currents produced in such machines. Such losses do not occur in the improved device to be presently described.

In the prior art device being discussed, if the full load speed of the A. C. driving motor is 1760 R. P. M., and the slip 50 R. P. M., the output speed at normal load will be 1710 R. P. M., the clutch slip being slightly less than 3%. In the case of a full load motor speed of 1150 R. P. M., the slip in terms of motor speed would be approximately 4.5% and the output speed would be 1100 R. P. M.

In Figs. 1 and 2 the flux lines 29, 30 and the paths 27, 28 are only shown in connection with three of the poles of the member 20, but it will be understood that they exist in connection with all the poles of said member.

Description of embodiments of the instant invention

Figure 4:
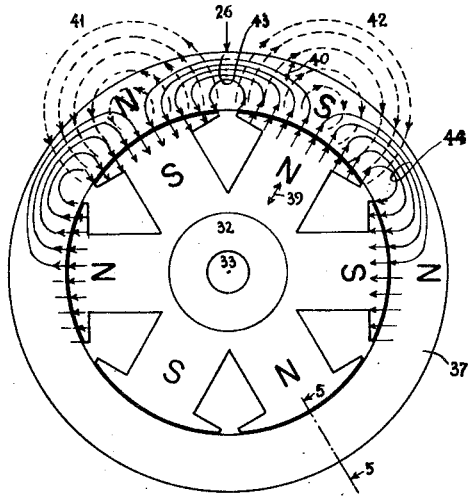

Figs. 3 and 4 show diagrammatically, elevational longitudinal views of a torque transmission embodying the invention. These views correspond to views of the prior art machine shown in Figs. 1 and 2.

Referring to Fig. 3, the numeral 32 denotes the driving member of the device supported on the shaft 33 connected to a source of power such as an electric motor or the like (not shown).

The driving member may have equal number of poles N, S, and for the sake of illustration, a standard 6 pole arrangement is shown. The driving member is usually constructed of soft iron.

Each pole has a field winding (not shown), and the windings are connected to a suitable source of direct current in any known manner such as that hereafter shown and described in connection with other embodiments of the invention, so that the driving member is energized while rotating to have alternate N, S poles as shown.

Each pole has a pole shoe 32p. These pole shoes extend circumferentially round the path of travel of the driving member and the tips such as 34, 35 of adjacent pole shoes are close together so that the gap 36 between adjacent pole shoes is reduced to a minimum.

By providing pole shoes that cover substantially the inner face of the driven member or ring 37, to be presently described, it will be seen that the maximum number of magnetic lines of force can flow perpendicularly across the air gap 38 between the pole shoes 32p and the ring 37, and that when relative motion takes place between the pole shoes and the ring, maximum hysteresis is produced in the ring which would not occur if large gaps were employed at 36. Thus, considerable increase in efficiency is obtained by reason of the arrangement of the pole shoes as described.

Figure 5:
Fig. 5 is a cross-sectional view on the line 5, 5 of Fig. 4.

The ring 37 is made up of a plurality of laminations of suitable steel as defined later herein. The planes of the laminations extend transversely across the path of the eddy currents, as shown in Fig. 5, in order to prevent any flow of eddy currents and these currents are therefore negligible, if they exist at all, and play no part in the operation of the device.

The driven member or ring 37 is suitably supported on a spider or the like, which has a shaft (not shown) which is axially aligned with the driven shaft 33.

Assuming the driving member 32 to be energized and rotating in a clockwise direction, and that the driving and driven members are lined up so that the points 39 and 40 thereon are in line with vertical line 26 as shown in Fig. 3, flux lines will extend from the N to S poles of the driving member via ring 37. Sets of such lines are indicated at 41 and 42.

Assuming that the driving and driven members rotate so that the points 39 and 40 move from the position as shown in Fig. 3 to that shown in Fig. 4, it will be apparent that the direction of the flux lines 41—42 will be reversed as shown at 43—44 in Fig. 4. This shift in the direction of the flux lines causes hysteresis in the ring 37, which appears as a driving torque; that is, a torque in the direction of rotation of the driving member 32. This torque is produced by the unwillingness, so to speak, of the iron molecules in the ring 37 to be continually orientated and reorientated. The result is that the ring 37 tends to rotate along with the driving member 32.

Since the magnetic induction of the selected steel is low, being equal to the permeability U times the magnetizing force H, and consequently having a high reluctance, the shape of the pole shoes 32p is such as to increase the magnetic induction and decrease the reluctance as much as possible. As shown in Figs. 3 and 4, the pole shoes 33 overlie almost the entire inner circumference of the ring 37, and the pole gaps 36 are relatively small. The reason for this has already been pointed out, but may be amplified by stating that the induction is equal to the number of perpendicular lines of force per unit area of cross section of magnetized material. Thus, the shoes 32p are made as long as possible so that the area of the ring 37 opposite the shoes is as great as possible, making the greatest number of lines of force perpendicular to the flux. This also reduces the reluctance.

It will be observed that if any eddy currents are present in the structure shown in Figs. 3 and 4, that they are parasitic and do not produce any torque.

It will also be observed that if the driving member 32 is rotated, ring 37 will also rotate in synchronism therewith. This synchronous condition will be maintained even if a force is applied to the shaft of the ring 37 in a direction counter to the direction of the rotation provided that this force (dynes) be of smaller magnitude than the force which would be required (in dynes) to reorient the molecules of iron in the ring 37.

As a further example, assume the driven member 32 to be coupled to a prime mover whose speed is 1800 revolutions per minute and with a certain excitation; assume a load to be applied to the shaft of ring 37, and it slowed to a speed of 1620 R. P. M. or 90% of the speed of the member 32. Assume the device had 6 poles as shown in Figs. 3 and 4. Then each of the poles in the rotor would cause the molecules of iron in the ring 37 to be oriented and reoriented 6 times for each revolution, and since the ring is going 180 revolutions slower than the rotor, the lines of force in the ring 37 would go through 6,480 magnetic cycles. This cyclic change required work to be done, and this work was caused by the load applied to the shaft of the ring 37 to slow it to 90% of the speed of member 32. The reason the ring decelerates to the speed of 1620 R. P. M., is because at that speed the "hysteresis loss" in the ring in watts, or other unit of work is equal to the applied load in the same units. In other words, the "hysteresis loss" is in equilibrium with the load.

Further, suppose a large load were applied to the ring shaft, such that the ring 37 now ran at 900 R. P. M., then the lines of force in the ring would have gone through 36×900, or 32,400 magnetic cycles. The "hysteresis loss" being proportional to frequency, or speed, would be five times greater than in the above example. Stated differently, at a ring speed of 900 R. P. M., the D. C. excitation being the same, the output torque would be five times greater than it was at 180 R. P. M.

If a still larger load be applied to the ring shaft so that the ring slowed to 10% of the rotor speed, or 180 R. P. M., then the induction in the ring would have gone through 1620×36, or 58,320 magnetic cycles, and in this case the "hysteresis loss" would be nine times greater.

It is seen that in this device the torque increases as the speed decreases, and were it possible to select a steel with an ideal hysteresis loop, the torque increase would be doubled as the speed was halved, thereby producing a constant horse-power output. However, since it is impossible to obtain a steel with these ideal characteristics, the same desired result, namely a constant H. P. is readily accomplished by the simple expedient of automatically varying the excitation current with ring speed.

With this hysteresis torque transmission, an electric motor, gasoline engine or other suitable prime mover may be operated at its normal speed, producing its maximum rate of H. P. The prime mover would then be coupled directly to the driving member 32 of the transmission and the ring 37 of the transmission connected to the load. If the prime mover were an induction motor running at 1750 R. P. M., and if the load were such that it required 10 H. P. at 175 R. P. M., and the coils of the rotor were energized to a point where the shaft of the ring member 37 were turned, with this load at 175 revolutions per minute, then the torque delivered to the load would be 300 foot pounds, which, at this speed, would produce 10 H. P.

It is seen from the above, that, with this invention, a prime mover can be operated at its ideal working speed and the maximum amount of torque will be developed in the transmission to take the load from a state of rest and gradually accelerate it to run at any desired speed.

A commercial form of the device shown diagrammatically in Figs. 3 and 4, and capable of transmitting several horse power, has approximately the following dimensions, from which the savings in space and weight made possible by this invention can be compared with prior art devices.

Overall length 16″
Overall width 20″
Area of shafts 1½″
Dimension of ring 37 as shown in cross section in Fig. 5: O. D. 19″; I. D. 17″; thickness 3″
Number of pole pieces, 8
Approximate dimensions of each coil on a pole piece, 4″×5″×3″ long
Number of turns in each coil, 1386
Resistance 10.5 ohms per coil
Width of air gap 38, .010″
Width of gaps 36, ¼″

The flux lines 41 and 42 are only shown in connection with three of the poles of member 32 in Figs. 3 and 4, but it will be understood that they also exist in connection with all the poles of said member in a manner that will be obvious.

It will be observed that the path of the flux lines such as 41, 42 lies entirely within the steel ring 37 which is of such proportions as those given above to have a magnetic reluctance equal or less than the magnetic reluctance of the magnetizing circuit, such as any pair of pole pieces connected by flux lines 41, Figures 3 and 4.

It will be understood that the dotted lines 41, 42, Figure 4 do not represent the path of the flux but are merely lead lines to indicate the flux lines within the steel ring 37 and how the latter shift during the operation of the device.

Figure 6:
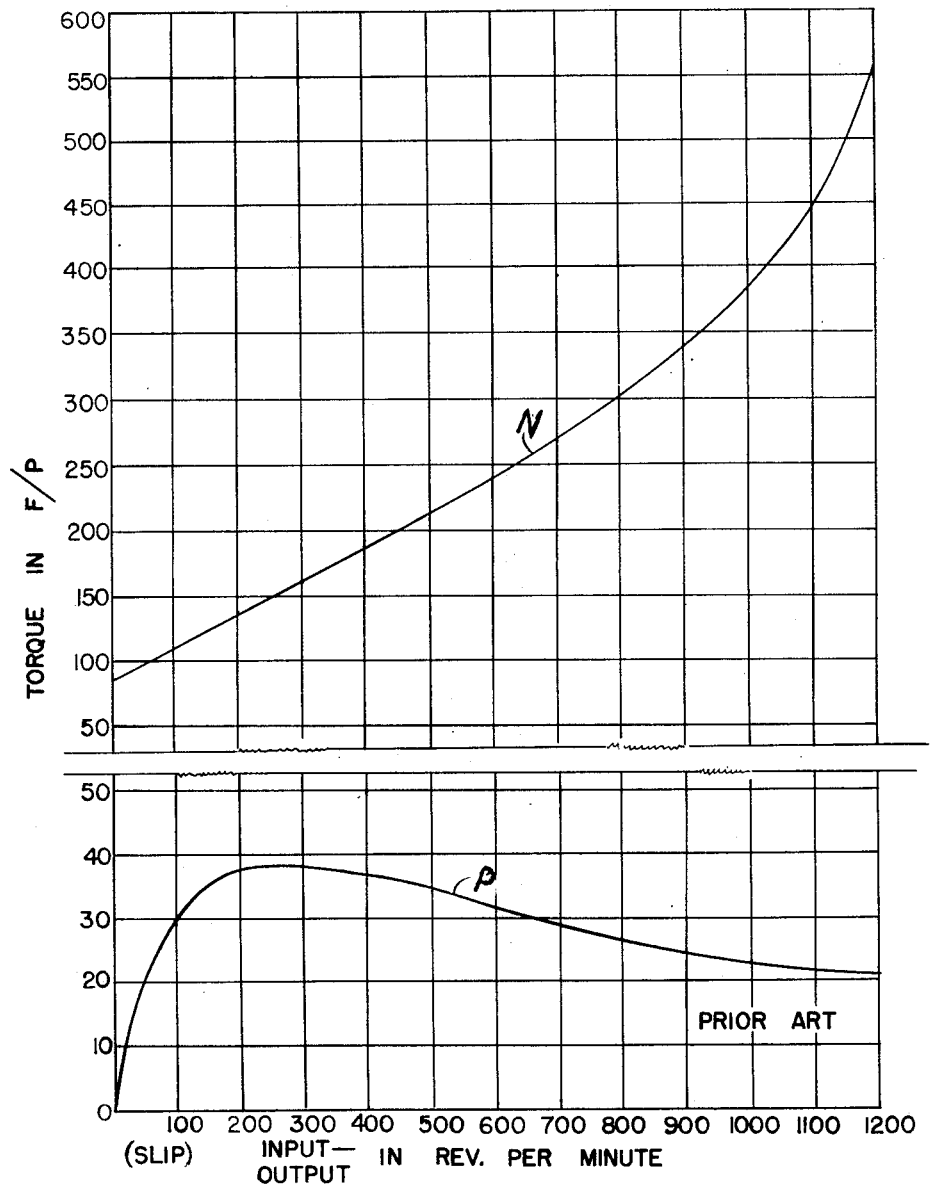
Fig. 6 is a torque diagram showing torque produced by the machines shown in Figs. 1, 2 and 3, 4.

Fig. 6 shows torque curves produced by two machines having the same number of poles and the same number of ampere turns, and constructed as near alike as possible. The curve P is produced by the eddy current prior art machine as described in connection with Figs. 1 and 2 hereof, and curve N is produced by the improved device employing hysteresis as described in connection with Figs. 3 and 4 hereof.

By comparing these two curves it becomes apparent that in the prior art machine the torque decreases as the difference in speed (slip) between the input and output increases, and that with applicant's machine the torque increases as the difference in the speed between the input and output increases.

A further study of Fig. 6 will reveal that the prior art machine can never operate at synchronism as it would produce no torque, whereas applicant's machine operating at synchronism would deliver a torque of approximately 90 foot pounds. In other words, applicant's machine running at synchronism will produce more torque than the prior art machine at its maximum.

Fig. 6 also reveals that at a slip speed of 1200, the prior art machine delivers approximately 20 F. P., while applicant's machine produces over 550 F. P. torque.

Figure 7:
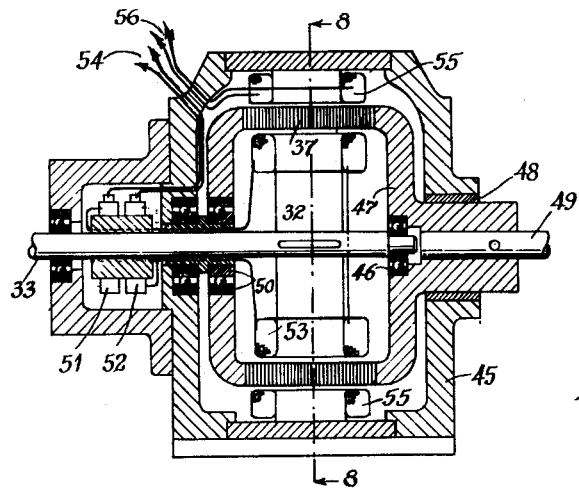
Fig. 7 is a longitudinal sectional view of a machine constituting a modification of that shown in Figs. 3, 4.
Figure 8:
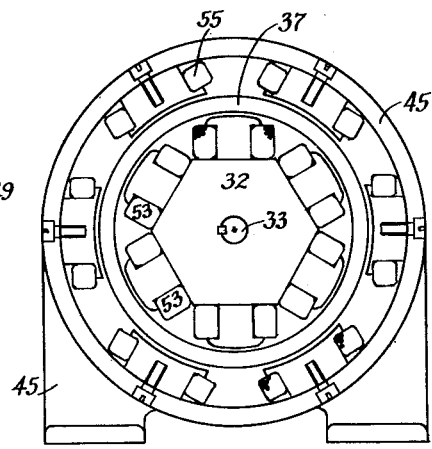
Fig. 8 is a sectional view on the line 8, 8 of Fig. 7.

Fig. 7 is a longitudinal, sectional view of a machine embodying the features disclosed in Figs. 3 and 5, and shows at 45 a frame in which driving shaft 33 is mounted in suitable bearings to rotatably support the driving member and its exciting coils 53 therein. One of the bearings for the shaft 33 (such as 46) is supported in the spider or framework 47 carrying the driven member or laminated ring 37. This ring and its spider framework are supported in a bearing 48 in the frame 45, and the spider is connected to a shaft 49 which is the driven shaft of the transmission (and is illustrative of a shaft for the ring 37 of Figs. 3 and 4, where this shaft is omitted). The opposite end of the spider 47 is supported in the bearing 50 on the shaft 33.

Mounted to rotate with, but insulated from shaft 33, are the conducting rings 51, 52, which are in turn connected by suitable conductors extending through shaft 33 to the coils 53 of the driving member. These rings have the usual contact brushes which are connected by conductors 54 to a source of direct current.

Spaced around the outer periphery of the ring 37 are the brake coils 55, suitably supported on the frame 45 and these coils are connected by conductors 56 to a suitable source of current via a suitable control apparatus.

Figure 9:
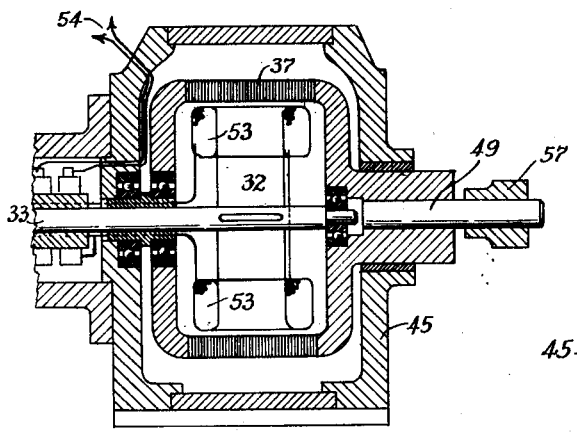
Fig. 9 is a longitudinal sectional view of another machine constituting a modification of that shown in Figs. 3, 4.
Figure 10:
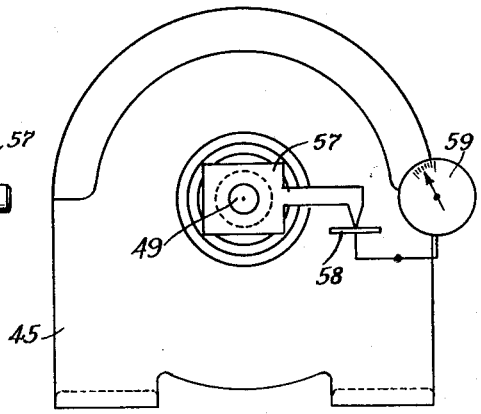
Fig. 10 is an end view of the machine Fig. 9 applied to a dynamometer.

As shown in Figs. 9 and 10, the brake coils 55 can be omitted when not required. For example, when the device is used as a dynamometer wherein the output shaft 49 is connected to a dynamometer arm 57 resting upon the platform 58 of the scale 59.

Referring to Fig. 10, if the shaft 49 is tending to rotate clockwise under torque developed between the ring 37 and the member 32, the scale 59 will measure this torque which measurement will be a measure of the power applied to the driving shaft 33 of member 32.

Figure 11:
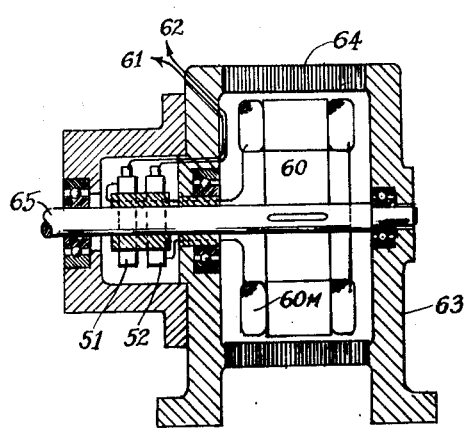
Fig. 11 is a longitudinal sectional view of another machine constituting a modification of that shown in Figs. 3 and 4.

In Fig. 11 is shown a simplified form of the device described in connection with Figs. 3 and 4 and 7-9 inclusive. Said Fig. 11 discloses a device employing the improved torque transmitter for applying a constant let-off tension on a roll of paper as it is being printed on a printing press.

In this embodiment of the invention, a rotatable member 60, corresponding in constructional details with the driving member 32 previously described, is provided with exciting coils which are connected via the rings 51 and 52 with a suitable control system (via wires 61 and 62).

The framework 63 has mounted thereon a stationary ring member 64 which may be in all respects (except for its mounting) constructed the same as the driven member 37 described in connection with Figs. 4 and 5.

It will be observed that the ring member 64 in Fig. 11 is stationary at all times, and that the shaft 65 carrying the rotatable member 60 is supported in suitable bearings in the framework 63 and revolves therein.

Figure 12:
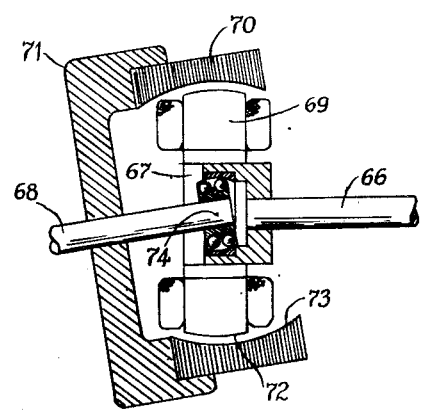
Fig. 12 is a longitudinal sectional view of another machine constituting a modification of that shown in Figs. 3 and 4.

Fig. 12 illustrates diagrammatically another embodiment of the invention as applied to a universal joint coupling and variable speed device. Here the driving shaft 66 supports bearing 67 for the inner ends of the shafts 66, 68. It will be observed that bearing 67 merely forms a support for the ends of the shafts 66, 68, and does not transmit any torque. It is constructed to permit shaft 68 to be driven out of line with shaft 66.

A driven member 69 is supported on the shaft 68 and rotates therewith. The construction of this member 69 may be the same as the member 33 described in connection with the preceding figures. Details of the mounting of the rings necessary to supply current to the windings of member 69 will be observed from the preceding figures and are omitted from Fig. 12.

A ring 70 of laminations constructed substantially the same as the ring 37 shown in Figs. 3, 4 and 5 is supported in a spider or framework 71, mounted to rotate with shaft 68. This ring therefore constitutes the driven member of the transmission.

It will be noted, however, that either of the shafts 66 or 68 may be the driving shaft or that the position of members 69 and 70 may be reversed without affecting the operation of the device. Bearings for shafts 66, 68 may be applied thereto and are not shown in Fig. 12.

From what has been said respecting the torque-relationship of the driving and driven members in Figs. 3 and 4, it will be evident how the device shown in Fig. 12 operates with the shafts 66, 68 out of axial alignment, as the opposed faces 72, 73 on these members are of arcuate formation to permit them to move radially about the center 74 of the bearing 67.

*Steel to be used in practicing this invention*

The foregoing examples of construction as shown in Figs. 3-5 and 7-12 inclusive are merely illustrative of different embodiments of the inventive concept herein disclosed, but it will be observed that all of these embodiments include a laminated steel ring such as that shown at 37, Figs. 3-5.

As has been previously pointed out herein, while prior art devices have had rotating parts of steel such as permanent magnets and the like, and whereas in connection with eddy current transmissions the word "steel" has sometimes been used, to describe material used in one of the members in the transmission, it will be apparent from the foregoing description of the prior art devices, that, particularly in the case of the eddy current transmissions, steel, when used, did not have the characteristics necessary to produce maximum hysteresis.

Figure 13:
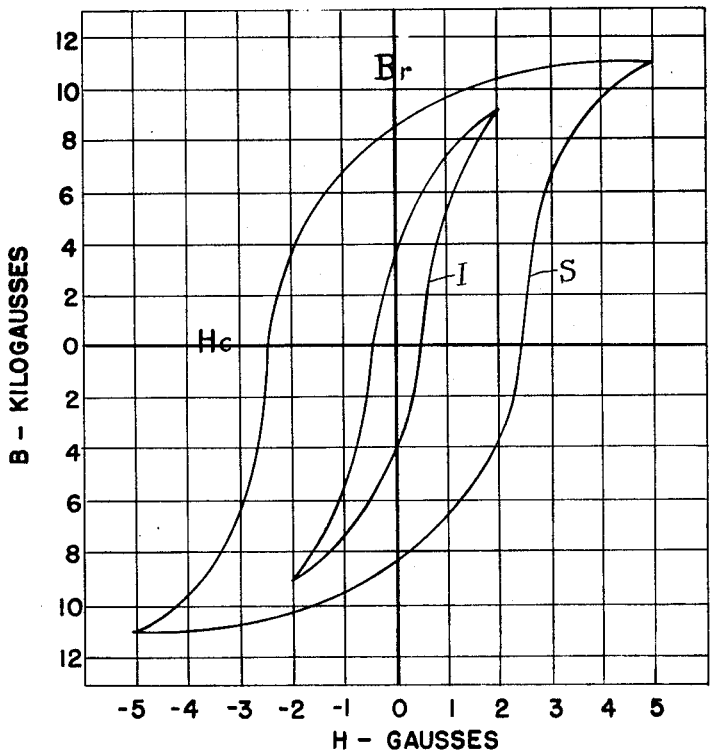
Fig. 13 is a hysteresis curve illustrating the method of selecting steel for use in any of the machines embodying the invention herein disclosed.

Now, referring to Fig. 13, wherein is shown a typical hysteresis curve for a suitable steel at S and a curve for soft iron at I, it may be said in general, that a steel with which to practice this invention should be selected in which the area of the hysteresis loop is as great as possible. This is attained by increasing the carbon content of the steel or by the addition of sulphur, or both. In some steels the carbon content may be brought up to 1.5%. Another factor is the heat treatment—tempering, etc., given the steel.

It is not desirable to use silicon steel which has low hysteresis. Such steel is very much like ingot iron, as far as hysteresis is concerned. In fact, it may be stated that the steels used to practice the invention herein disclosed, have characteristics which are the reverse of the "steels" commonly used in the construction of prior art devices.

As an example of a suitable steel that may be used in the construction of a device as herein disclosed, reference is made to S. A. E. steel Number 1040, having characteristics as defined in the Society of Automotive Engineers Handbook, 1946 edition, which also gives the necessary data re normalizing, annealing, hardening, tempering, etc. This is a medium carbon steel possessing fair machining properties, and having deep hardening characteristics, and is readily obtainable commercially. It may be hardened at 1525-1575° F. in oil or water to the desired hardness.

With machines of higher capacity it might be advisable to have a cobalt steel corresponding to $Fe_2Co$ or with 34.5 cobalt.

It will be understood that the exact steel used for a machine of any given dimensions will depend somewhat on machine dimensions, taking into consideration the problem of machining (punching or the like), but that satisfactory results will be obtained if the general rule applied to Fig. 13 be followed, namely, select a steel that can be machined and heat treated to the extent desired to have a hysteresis loop of maximum area.

The nearer the curve approaches the curve I, Fig. 6, the less suitable the material will be for practicing this invention.

What is claimed is:

1. A device for drivingly connecting two rotatable members, comprising two parts connected respectively to said members, one of said parts comprising an annular series of alternate north and south pole pieces each having a pole shoe thereon extending circumferentially beyond the pole piece all of which shoes have arcuate outer faces, the adjacent edges of each pair of adjacent pole shoes being closely adjacent and being separated by a gap which is only sufficiently large to prevent high flux leakage, electrical means for energizing said pole pieces and shoes, the second part comprising a ring of substantial mass and bulk formed of magnetizable but unmagnetized high hysteresis loss material the inner periphery of which surrounds and is positioned closely adjacent the arcuate outer faces of the pole shoes and which ring forms the sole path for magnetic flux generated by said pole pieces.

2. A device for drivingly connecting two rotatable members, comprising two parts connected respectively to said members, one of said parts comprising an annular series of alternate north and south pole pieces, the adjacent edges of the outer ends of which are so closely adjacent that the outer end surfaces form a substantially continuous surface and such adjacent edges are separated by a gap which is only sufficiently large to prevent high flux leakage, electrical means for energizing said pole pieces, the second part comprising a member of substantial mass and bulk formed of magnetizable but unmagnetized high hysteresis loss material positioned closely adjacent the outer ends of the pole pieces and forming the sole path for magnetic flux generated by said pole pieces.

3. An electrical device including a frame, a ring member comprised of laminated hardened steel in which the molecules are subjected to orientation and reorientation, said member constituting the sole path for flux generated outside said member, said member having a magnetic reluctance equal to or less than the magnetic reluctance of the path for flux generated outside said member rotatably supported in said frame, a second member rotatably supported in said frame and having soft iron pole shoes having wide arcuate faces extending around said ring member, each of said pole shoes extending laterally to overlie and extend beyond the body supporting same, the adjacent tips of said pole shoes being closely adjacent to each other, the gap therebetween being only sufficient to prevent high flux leakage, and a winding on said second member to magnetize said pole shoes and thereby cause said orientation and reorientation in the molecules in said ring member when said members are relatively rotated.

4. The electrical device as claimed in claim 3 wherein the arcuate pole shoe faces overlie substantially all of the adjacent face of said ring member, the gaps between adjacent pole shoes lying transverse the axis of said ring and being only sufficient to prevent excessive flux leakage between adjacent pole shoes.

5. The electrical device as claimed in claim 3, wherein said arcuate pole shoes have relatively thin opposed extremities lying transverse the axis of said ring member, whereby flux leakage between adjacent pole shoes is reduced to a minimum.

6. The electrical device as claimed in claim 3, wherein said second member comprises a soft iron center having radially extending pole pieces secured thereto, each pole piece being of uniform cross-section throughout and each pole piece having an arcuate pole shoe overlying the winding thereon and extending circumferentially about said ring member, said pole shoes having closely adjacent extremities lying transverse the axis of rotation of said second member.

7. A device of the character described, comprising a pair of axially aligned shafts, a coupling for the adjacent ends of said shafts, said coupling including a member supported on each of said shafts, said members forming a bearing and said members having arcuate engaging surfaces whereby they may assume various angular positions with respect to the center of the bearing, a torque transmitting member connected to each of said shafts, one of said members has a solid continuous periphery and, a magnetic circuit the reluctance of which is equal to or less than the magnetic reluctance of the magnetic circuit of the other of said members, the other of said members having a winding thereon, both said members having arcuate faces whereby one may move about the other in a path the center of which is the center of said bearing.

ROBERT HELMER.

REFERENCES CITED

The following references are of record in the file of this patent:

UNITED STATES PATENTS

| Number | Name | Date |
|---|---|---|
| 1,424,769 | Morrison | Aug. 8, 1922 |
| 1,665,613 | Tanner | Apr. 10, 1928 |
| 1,862,267 | Honig | June 7, 1932 |
| 1,982,461 | Winther | Nov. 27, 1934 |
| 2,070,447 | Morrill | Feb. 9, 1937 |
| 2,183,404 | Morrill | Dec. 12, 1939 |
| 2,241,983 | Connolly | May 13, 1941 |
| 2,257,300 | Hines | Sept. 30, 1941 |
| 2,285,246 | Winther | June 2, 1942 |
| 2,317,290 | McIlvried | Apr. 20, 1943 |
| 2,373,609 | Stahl | Apr. 10, 1945 |
| 2,386,505 | Puchy | Oct. 9, 1945 |
| 2,454,111 | Winther | Nov. 16, 1948 |

FOREIGN PATENTS

| Number | Country | Date |
|---|---|---|
| 356,945 | Great Britain | Sept. 17, 1931 |
| 436,145 | Great Britain | Oct. 7, 1935 |
| 458,671 | Great Britain | Dec. 18, 1936 |
| 18,279 | Australia | of 1934 |

OTHER REFERENCES

"Experimental Electrical Engineering," Karapetoff, vol. 1, second edition, published in 1910 by John Wiley & Sons, New York city, pages 190 to 195.